US012554347B1

(12) United States Patent
Zhuang (10) Patent No.: US 12,554,347 B1
(45) Date of Patent: Feb. 17, 2026

(54) RECOGNITION SYSTEM FOR RECOGNIZING MULTIPLE INPUTS OF GESTURES, HANDWRITING SYMBOLS AND VIRTUAL KEYS ON TOUCH SCREEN (71) Applicant: Jianming Zhuang, Singapore (SG)

(72) Inventor: Jianming Zhuang, Singapore (SG)

(73) Assignee: SUNIA PTE. LTD., Singapore (SG)

( * ) Notice: Subject to any disclaimer, the term of this patent is extended or adjusted under 35 U.S.C. 154(b) by 0 days.

(21) Appl. No.: 18/948,562

(22) Filed: Nov. 15, 2024

Related U.S. Application Data (62) Division of application No. 18/384,890, filed on Oct. 30, 2023, now Pat. No. 12,366,955.

(51) Int. Cl.
G06F 3/0489 (2022.01)
G06F 3/01 (2006.01)
G06F 3/041 (2006.01)

(52) U.S. Cl.
CPC .............. *G06F 3/041* (2013.01); *G06F 3/017* (2013.01); *G06F 3/0489* (2013.01)

(58) Field of Classification Search
None
See application file for complete search history.

(56) References Cited

U.S. PATENT DOCUMENTS

| | | | | |
|---|---|---|---|---|
| 8,059,015 B2* | 11/2011 | Hua | ..................... | G06F 3/04886 178/18.05 |
| 2009/0066541 A1* | 3/2009 | Ma | ......................... | G06F 3/0231 341/22 |
| 2014/0298266 A1* | 10/2014 | Lapp | .................... | G06F 3/04886 715/835 |
| 2014/0327636 A1* | 11/2014 | Day | ......................... | G06F 3/048 345/173 |
| 2017/0153792 A1* | 6/2017 | Kapoor | ............... | G06F 3/04883 |

\* cited by examiner

*Primary Examiner* — Parul H Gupta (57) ABSTRACT

A recognition system for recognizing multiple inputs of gestures, handwriting symbols and virtual keys on a touch screen includes a touch IC serves to convert a plurality of touch signals of the touch screen to a touch data frame. A processor set is connected to the touch IC and serves to perform a touch data processing on the touch data frame. The touch data processing is performed by using a processing directly executed by an OS (Operating System) and a processing of AI (artificial intelligence) recognizing. An AI recognition module is connected to the processor set. The AI recognition module is used for recognizing multiple key inputs, operation gestures and handwriting symbols. The key inputs and handwriting symbols are corrected by a grammar correction and a symbol correction respectively. The touch screen serves to display a virtual keyboard.

6 Claims, 11 Drawing Sheets

RECOGNITION SYSTEM FOR RECOGNIZING MULTIPLE INPUTS OF GESTURES, HANDWRITING SYMBOLS AND VIRTUAL KEYS ON TOUCH SCREEN

The present invention is a divisional application of U.S. patent application Ser. No. 18/384,890, filed at Oct. 30, 2023, which is invented by and assigned to the applicant of the present invention, and thus the contents of the U.S. patent application Ser. No. 18/384,890 is incorporated into the present invention as a part of the present invention.

FIELD OF THE INVENTION

The present invention is related to recognition of inputs of a touch screen, and in particular to a recognition system for recognizing multiple inputs of gestures, handwriting symbols and virtual keys on a touch screen.

BACKGROUND OF THE INVENTION

Many electronic products use touch screens as input devices, which are widely used in various industries, such as computers, PADs, mobile phones, automobiles, medical equipment, industrial control equipment, etc. Input on the touch screens is performed by a gesture, virtual key click or a stylus. However, in the prior arts, the virtual keyboard on the touch screen has disadvantages that the virtual keyboard lacks the feeling of typing on an actual keyboard, and the position of the virtual keyboard is fixed and cannot be changed, which is very inconvenient for input. Although some individual inventions provide a virtual keyboard with a special key arrangement, the user still needs to keep eyes on the virtual keyboard to touch the correct key, which decreases the input speed and is prone to produce input mistakes.

The general electronic devices have three main types of input. The first type is performed by an operation gesture which is mainly used to operate the displaying of various function panels or to call related application (APP). The second type is performed by key inputs, wherein a virtual keyboard is displayed on the touch screen and the user performs an input through the virtual keyboard. The third type is performed by complex graphical inputs which may be handwriting characters or mathematical expressions.

The operation gesture is commonly supported by the operating system of the electronic devices and is easier to be recognized.

For the key input, since the general touch screen only has a simple virtual keyboard which has a keyboard layout very different from that of the traditional actual keyboard (a physical keyboard). Due to limited control of the traditional touch screen and its operating system, the operations on the virtual keyboard must be inputted through a continuous sequence of multiple actions, which causes a slow input speed than the traditional actual keyboard. In addition, the virtual keyboard cannot receive multiple inputs of fingers like the traditional actual keyboard.

For handwriting characters such as general English letters or Chinese characters, handwriting recognition can be used for recognizing them. However, the input mode of the virtual keyboard must be switched before the handwriting recognition can be performed. For the mathematical expressions, all of the traditional touch screen cannot recognize the mathematical expressions.

Therefore, the present invention desires to provide a novel invention for recognizing multiple inputs of gestures, handwriting symbols and virtual keys on a touch screen, which is capable of recognizing multiple consecutive inputs on the touch screen. Therefore, the user can operate the touch screen as smooth and fast as using actual keys. The present invention also can be used for recognizing handwriting characters and mathematical expression, which solve the above mentioned disadvantages of prior arts.

SUMMARY OF THE INVENTION

Accordingly, for improving above mentioned defects in the prior art, the object of the present invention is to provide a recognition system for recognizing multiple inputs of gestures, handwriting symbols and virtual keys on a touch screen, wherein the advantages of the present invention are that the present invention is capable of pre-determining whether the input data of a stylus, gesture or virtual keys on the touch screen is capable of directly processed by the operating system of the touch device having the touch screen. When the input data is capable of directly processed by the operating system, the operating system is used for recognizing the gesture or virtual keys. When the input data is not capable of directly processed by the operating system, the input data from the gesture or stylus are predicted and recognized by using an AI recognition module so that the recognizing result can be processed by the operating system. Therefore, the user can operate the touch screen as smooth and fast as using actual keys. The AI recognition module of the present invention is used for recognizing multiple key inputs, operation gestures and handwriting symbols (including characters and mathematical expressions) simultaneously. The key inputs and handwriting symbols are corrected by grammar and symbol corrections. Therefore, the accuracy of the gestures, key inputs and stylus input on the touch screen and the response speed of the touch input are improved, which increases the user's input speed on the touch screen and reduces the errors of input or operation on the touch screen so that the user's operating experience is improved.

To achieve above object, the present invention provides a recognition system for recognizing multiple inputs of gestures, handwriting symbols and virtual keys on a touch screen comprising: the touch screen serving to receive a touch action of a user for generating a plurality of touch signals; the touch screen being a touch panel of an electronic device; a touch IC connected to the touch screen; the touch IC serving to receive the touch signals from the touch screen and to convert the touch signals to a touch data frame which has a 2D (two-dimensional) structure formed by a plurality of touch data items; a processor set connected to the touch IC and an OS (Operating System); the processor set serving to receive the touch data frame from the touch IC and to perform a touch data processing on the touch data frame; the touch data processing being performed by using a processing directly executed by the OS and a processing of AI (artificial intelligence) recognizing; wherein in the touch data processing, when the touch data frame corresponds to a plurality of second inputs and a number of the second inputs is larger than or equal to the predetermined number, the touch data frame is viewed as a data frame which is not capable of being directly processed by the OS and is outputted to a AI (artificial intelligence) recognition module for recognizing the touch data frame; the AI recognition module is connected to the processor set; an AI recognizing result outputted by the AI recognition module is outputted to the processor set; when the AI recognizing result is corresponded to a plurality of specific key inputs, the processor set performs a grammar correction on the specific key inputs and a result of the grammar correction on the specific key inputs is outputted to the OS for processing; when the AI recognizing result is corresponded to at least one specific handwriting symbol including a character string or a mathematical expression, the processor set performs a symbol correction on the at least one specific handwriting symbol and a result of the symbol correction on the at least one specific handwriting symbol is outputted to the OS for processing; when the AI recognizing result is corresponded to a specific operation gesture, the processor set outputs the specific operation gesture to the OS for processing; wherein in the touch data processing, the touch IC serves to perform an initial processing; the initial processing is that the touch IC receives the touch signals from the touch screen and converts the touch signals to the touch data frame; a preprocess unit connected to the touch IC; wherein in the touch data processing, the preprocess unit serves to receive the touch data frame and to perform a noise filtering, a normalization and a data splitting on the touch data frame; and the touch screen serving to display a virtual keyboard or a part of the virtual keyboard for being viewed by the user and receiving the touch action of the user.

To achieve above object, the present invention further provides a fast multiple input keyboard system on a touch screen comprising: the touch screen serving to receive a touch action of a user for generating a plurality of touch signals; the touch screen being a touch panel of an electronic device; a virtual keyboard displayed on the touch screen; a touch IC connected to the touch screen; the touch IC serving to receive the touch signals from the touch screen and to convert the touch signals to a touch data frame which has a 2D (two-dimensional) structure formed by a plurality of touch data items; a processor set connected to the touch IC and an OS (Operating System); the processor set serving to receive the touch data frame from the touch IC and to perform a touch data processing on the touch data frame; the touch data processing being performed by using a processing directly executed by the OS; and the virtual keyboard including an upper key set and a lower key set positioned on a lower side of the upper key set; and the virtual keyboard further including a plurality of function keys, a number key and a symbol key which are arranged on a left side and a right side of the virtual keyboard, and a plurality of character keys which are arranged on a center of the virtual keyboard.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
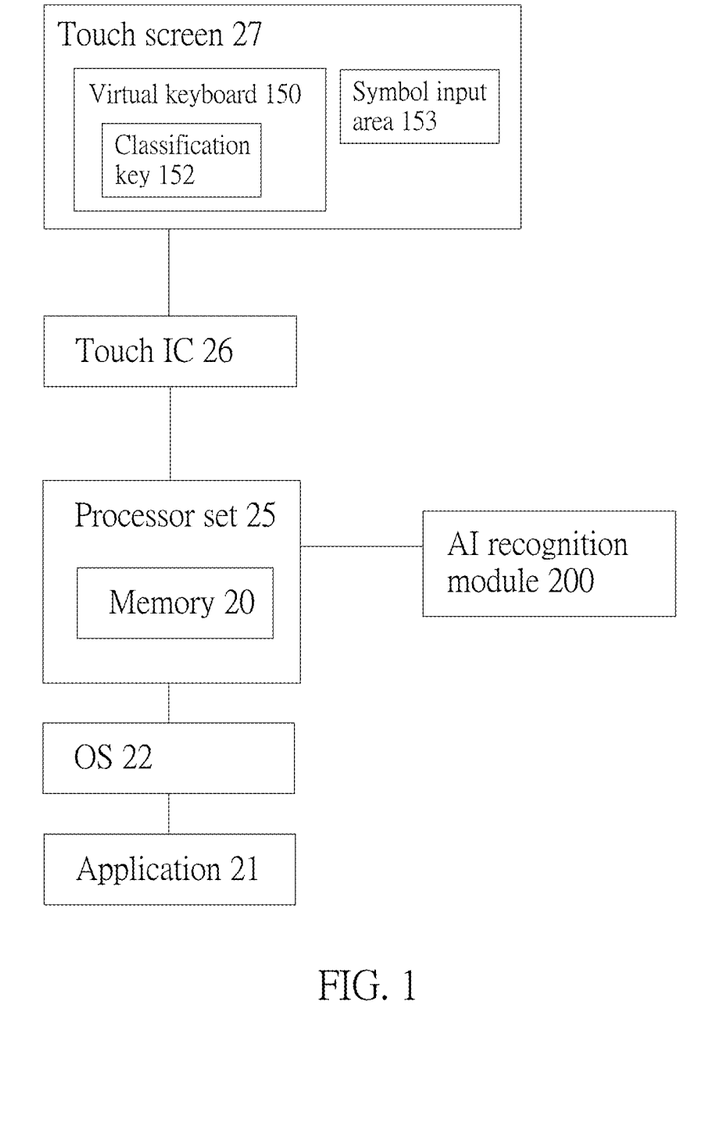
FIG. 1 is a structured block diagram showing main elements of the present invention.

With reference to FIGS. 1 to 11, a recognition system for recognizing multiple inputs of gestures and handwriting symbols and virtual keys on a touch screen 27 of the present invention is illustrated. The touch screen 27 is capable of receiving the handwriting symbols having characters or mathematical expressions inputted by a user. Referring to FIG. 1, the recognition system includes the following elements.

The touch screen 27 serves to receive a touch action of a user for generating a plurality of touch signals. The touch signals are electronic signals formed by electrical changes of a plurality of pixels of the touch screen 27 caused by the touch action. The touch screen 27 is a touch panel of an electronic device, such as a touch panel of a mobile phone or a tablet.

Figure 6:
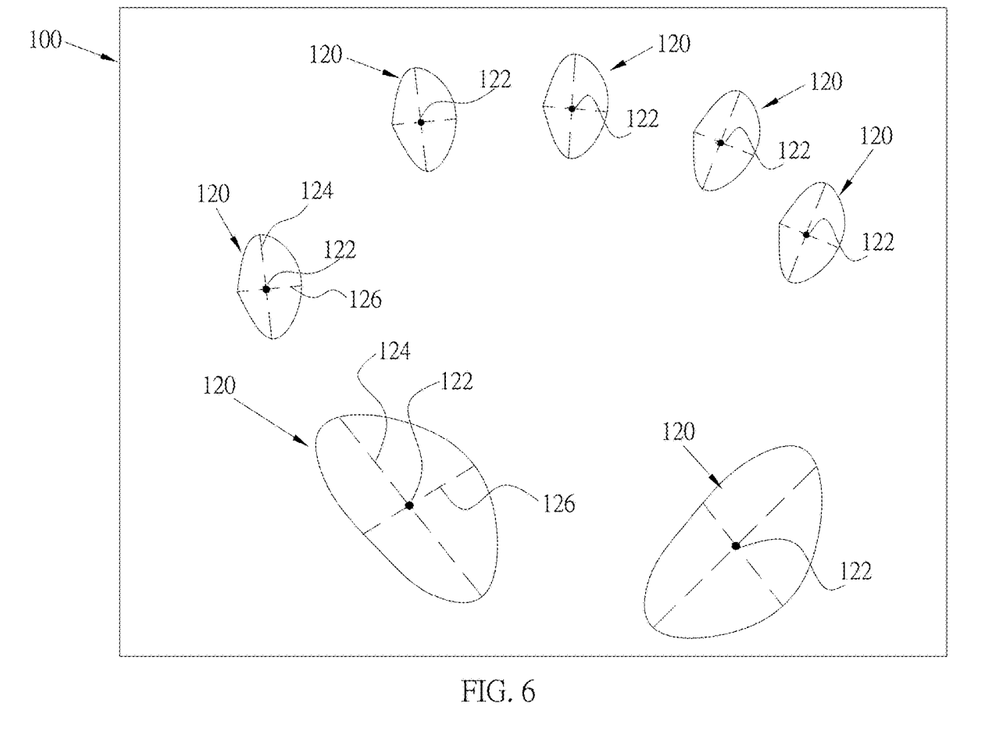
FIG. 6 is a schematic view showing the touch data frame of the present invention.

A touch IC 26 is connected to the touch screen 27. The touch IC 26 serves to receive the touch signals from the touch screen 27 and to convert the touch signals to a touch data frame 100 which has a 2D (two-dimensional) structure formed by a plurality of touch data items 110. Referring to FIG. 6, the touch data frame 100 includes a plurality of touch areas 120. Each of the touch areas 120 is corresponded to a pressed area touched by the touch action on the on the touch screen 27. In processing of the touch areas 120, representative coordinates 122, lengths of a longer axis 124 and a shorter axis 126 (which are two mutually perpendicular axes of a minimum rectangle covering a corresponding touch area 120) in each of the touch areas 120 are recorded.

A processor set 25 is connected to the touch IC 26 and an OS (Operating System) 22. The processor set 25 serves to receive the touch data frame 100 from the touch IC 26 and to perform a touch data processing on the touch data frame 100. The touch data processing is performed by using a processing directly executed by the OS 22 and a processing of AI (artificial intelligence) recognizing.

In the touch data processing, when the touch data frame 100 corresponds to a plurality of first inputs and a number of the first inputs is less than a predetermined number, the touch data frame 100 is viewed as a data frame which is capable of being directly processed by the OS 22 and is outputted to the OS 22 for processing. When the touch data frame 100 corresponds to a plurality of second inputs and a number of the second inputs is larger than or equal to the predetermined number, the touch data frame 100 is viewed as a data frame which is not capable of being directly processed by the OS 22 and is outputted to a AI (artificial intelligence) recognition module 200 for recognizing the touch data frame 100. The AI recognition module 200 is connected to the processor set 25. An AI recognizing result outputted by the AI recognition module 200 is outputted to the processor set 25. When the AI recognizing result is corresponded to a plurality of specific key inputs, the processor set 25 performs a grammar correction on the specific key inputs and a result of the grammar correction on the specific key inputs is outputted to the OS 22 for processing. When the AI recognizing result is corresponded to at least one specific handwriting symbol including a character string or a mathematical expression, the processor set 25 performs a symbol correction on the at least one specific handwriting symbol and a result of the symbol correction on the at least one specific handwriting symbol is outputted to the OS 22 for processing. When the AI recognizing result is corresponded to a specific operation gesture, the processor set 25 outputs the specific operation gesture to the OS 22 for processing.

When the processing of the OS 22 is completed, the OS 22 outputs related data to a respective application 21 connected to the OS 22.

Figure 2:
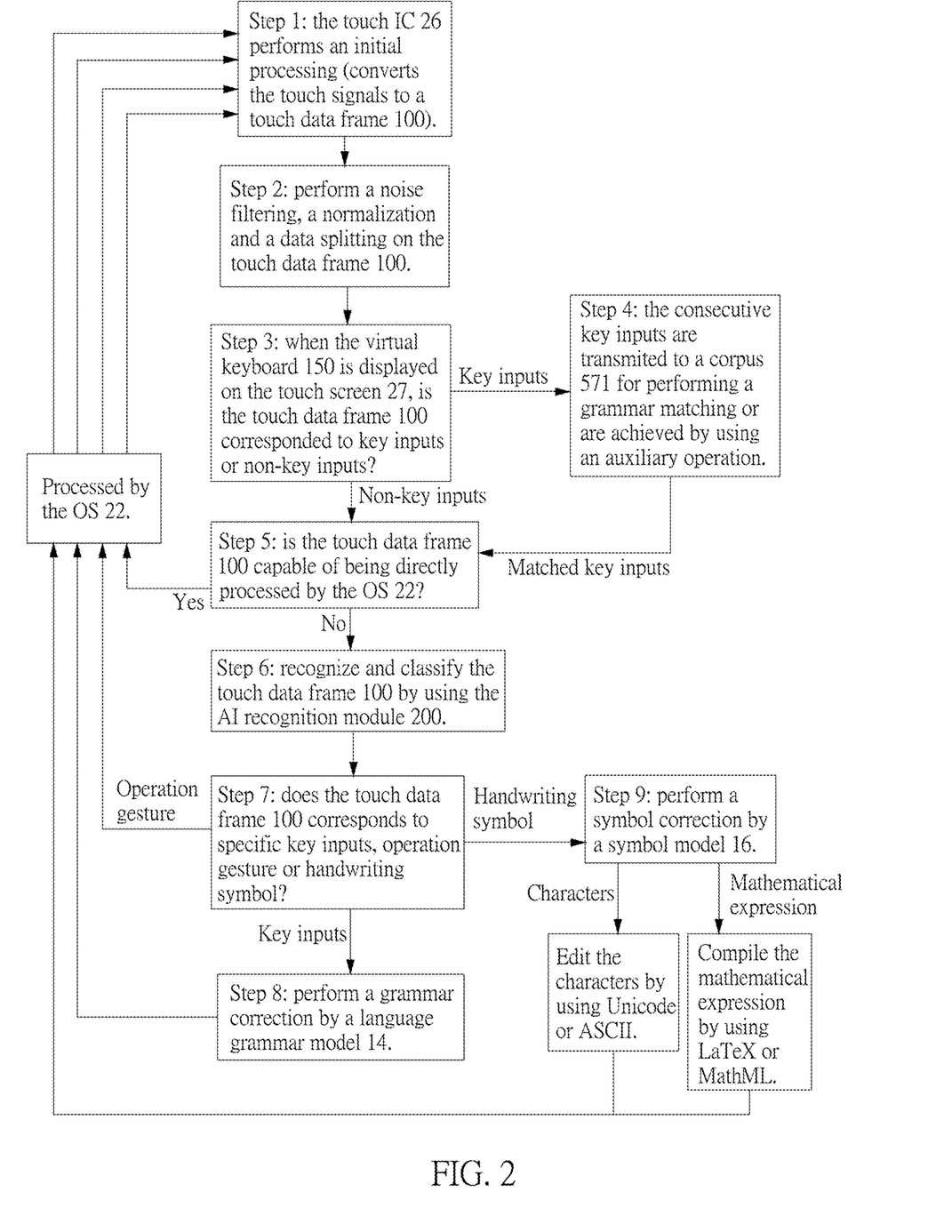
FIG. 2 is a steps flow diagram showing steps of operations of the touch data processing of the present invention.
Figure 3:
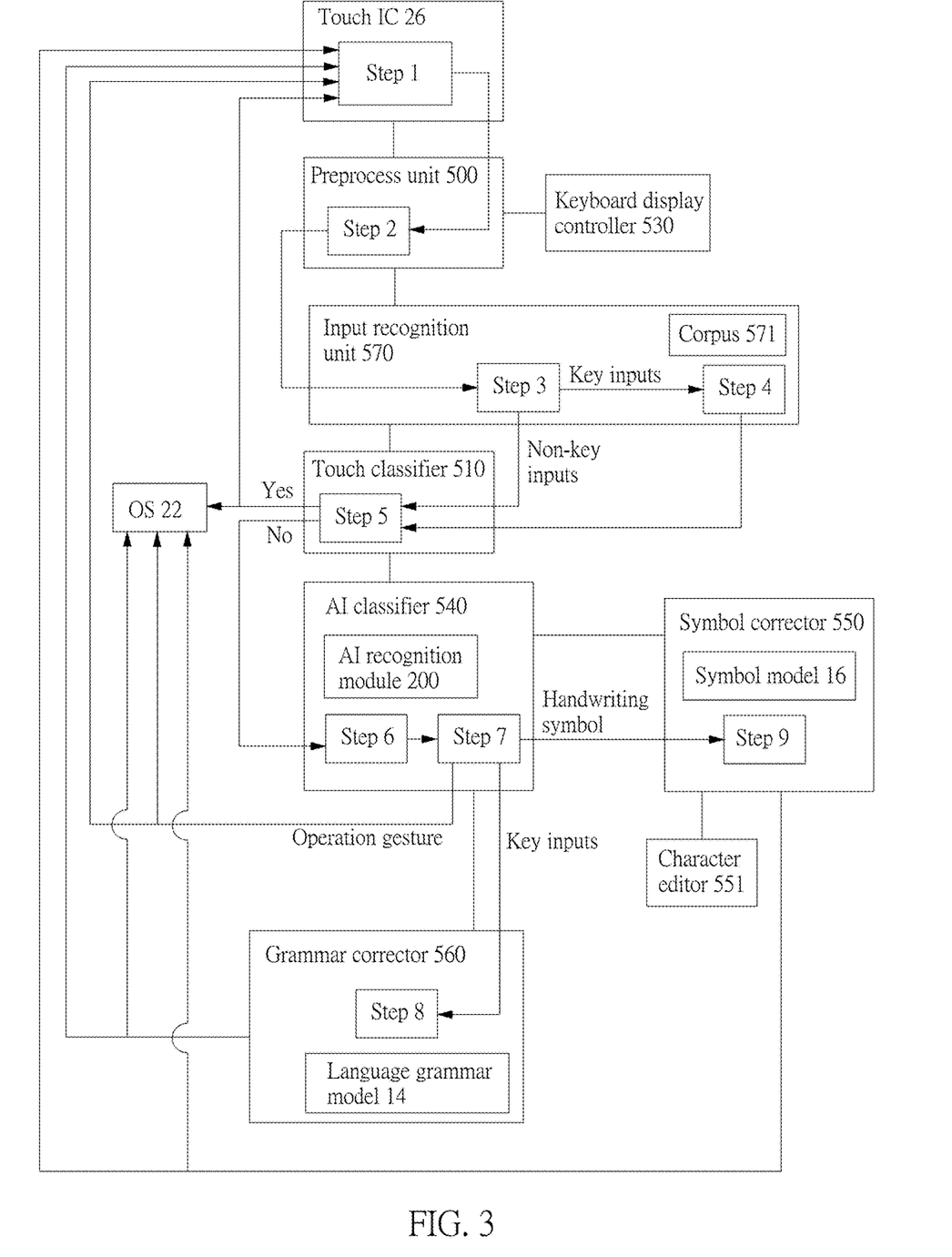
FIG. 3 is a structured block diagram showing the elements related to the touch data processing of the present invention.

FIGS. 2 and 3 show the steps and structured blocks related to the touch data processing of the processor set 25. The touch data processing is performed by using the touch IC 26, a preprocess unit 500, an input recognition unit 570, a touch classifier 510, an AI (artificial intelligence) classifier 540, a symbol corrector 550 and a grammar corrector 560.

The touch IC 26 serves to perform an initial processing. The initial processing is that the touch IC 26 receives the touch signals from the touch screen 27 and converts the touch signals to the touch data frame 100 (step 1 in FIG. 2).

The preprocess unit 500 is connected to the touch IC 26. The preprocess unit 500 serves to receive the touch data frame 100 and to perform a noise filtering on the touch data frame 100 for removing unnecessary noises, a normalization on the touch data frame 100 for normalizing values of the touch data items 110 of the touch data frame 100 in a predefined range, and a data splitting for splitting the touch data items 110 of the touch data frame 100 for further processing (step 2). The touch data items 110 are stored in a memory 20 of the processor set 25.

The touch screen 27 serves to display a virtual keyboard 150 or a part of the virtual keyboard 150 for being viewed by the user and receiving the touch action of the user. The touch screen 27 is capable of displaying a certain row of keys of the virtual keyboard 150.

The virtual keyboard 150 includes an upper key set 160 and a lower key set 180 positioned on a lower side of the upper key set 160. The virtual keyboard 150 further includes a plurality of function keys 80, a number key and a symbol key 60 which are arranged on a left side and a right side of the virtual keyboard 150, and a plurality of character keys 70 which are arranged on a center of the virtual keyboard 150.

The function keys 80 include a Caps Lock key 82, a enter key 84, a first shift key 81, a control key 83, a space key 85, a Alt key 87 and a second shift key 89. The upper key set 160 is in a symmetrical M shape for accommodating two hands of the user. The lower key set 180 is in a concave curved shape. The lower key set 180 includes the control key 83, the space key 85 and the Alt key 87.

Figure 7:
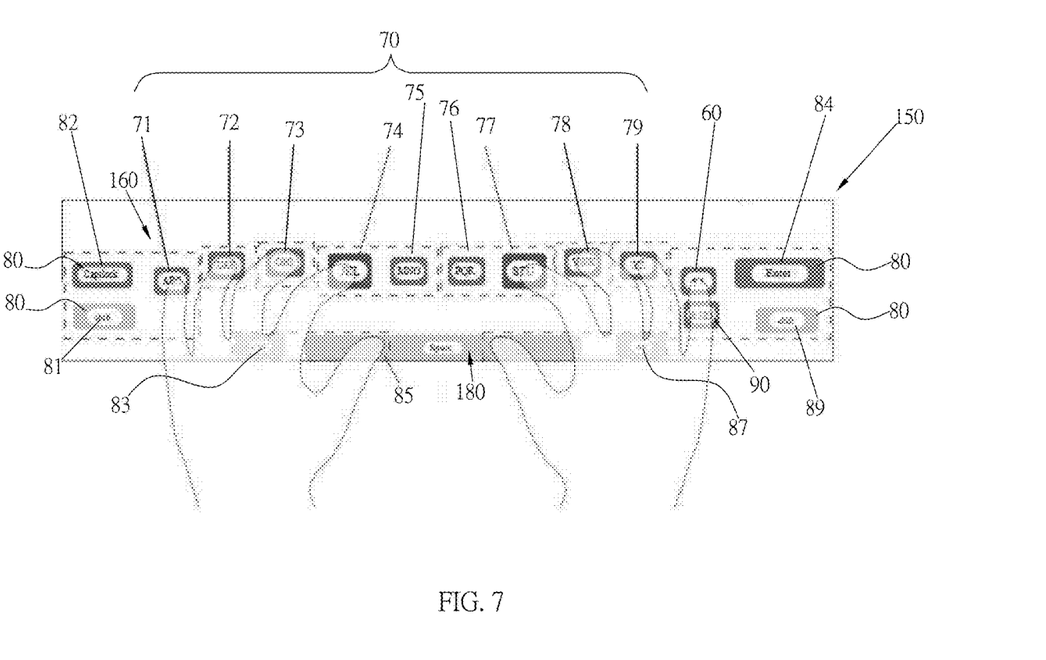
FIG. 7 is a schematic view showing the first embodiment of the virtual keyboard.
Figure 8:
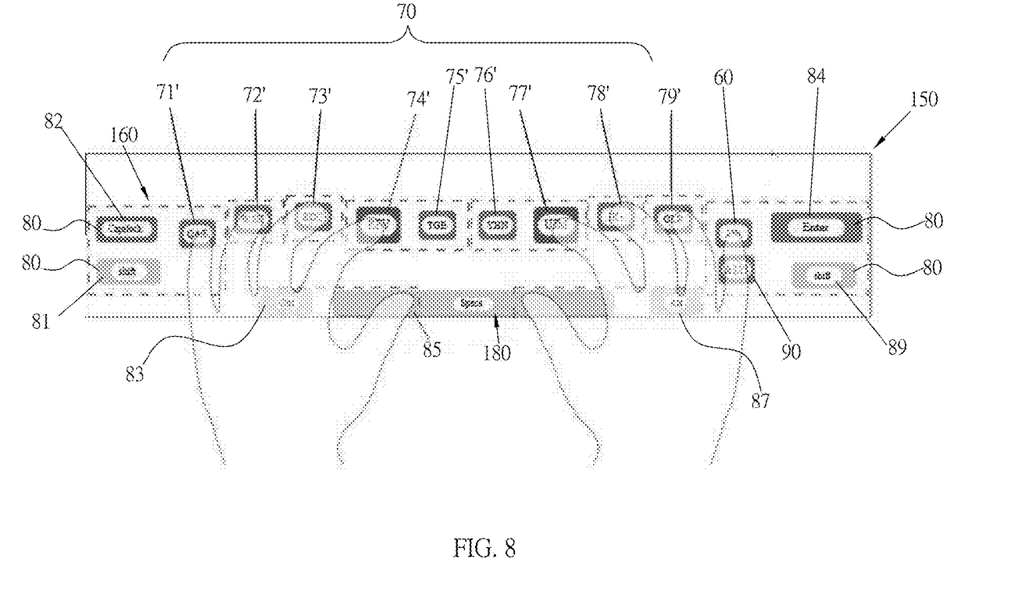
FIG. 8 is a schematic view showing the second embodiment of the virtual keyboard.

Referring to FIGS. 7 and 8, in the first and second embodiment of the virtual keyboard 150, the character keys 70 are 9 character keys 70. The upper key set 160 includes 12 keys which are the Caps Lock key 82, 9 character keys 70, the symbol key 60 and the enter key 84 respectively from a left side to a right side of the upper key set 160. Each of the 9 character keys 70 serves for inputting two or three different letters. The lower key set 180 includes 6 keys which are the first shift key 81, the control key 83, the space key 85, the Alt key 87, the number key 90 and the second shift key 89 respectively from a left side to a right side of the lower key set 180.

In the first embodiment of the virtual keyboard 150 (as shown in FIG. 7), the 9 character keys 70 are formed with an alphabetical order. The 9 character keys 70 from the left side to the right side of the virtual keyboard 150 are an ABC key 71 corresponded to three letters "A", "B" and "C", a DEF key 72 corresponded to three letters "D", "E" and "F", a GHI key 73 corresponded to three letters "G", "H" and "I", a JKL key 74 corresponded to three letters "J", "K" and "L", a MNO key 75 corresponded to three letters "M", "N" and "O", a PQR key 76 corresponded to three letters "P", "Q" and "R", a STU key 77 corresponded to three letters "S", "T" and "U", a VWX key 78 corresponded to three letters "V", "W" and "X", and a YZ key 79 corresponded to two letters "Y" and "Z", respectively.

In the second embodiment of the virtual keyboard 150 (as shown in FIG. 8), the 9 character keys 70 are formed based on an order from an upper side to a lower side of a QWERTY keyboard layout. The 9 character keys 70 from the left side to the right side of the virtual keyboard 150 are a QAZ key 71' corresponded to three letters "Q", "A" and "Z", a WSX key 72' corresponded to three letters "W", "S" and "X", a EDC key 73' corresponded to three letters "E", "D" and "C", a RFV key 74' corresponded to three letters "R", "F" and "V", a TGB key 75' corresponded to three letters "T", "G" and "B", a YHN key 76' corresponded to three letters "Y", "H" and "N", a UJM key 77' corresponded to three letters "U", "J" and "M", a IK key 78' corresponded to two letters "I" and "K", a OLP key 79' corresponded to three letters "O", "L" and "P", respectively.

Figure 9:
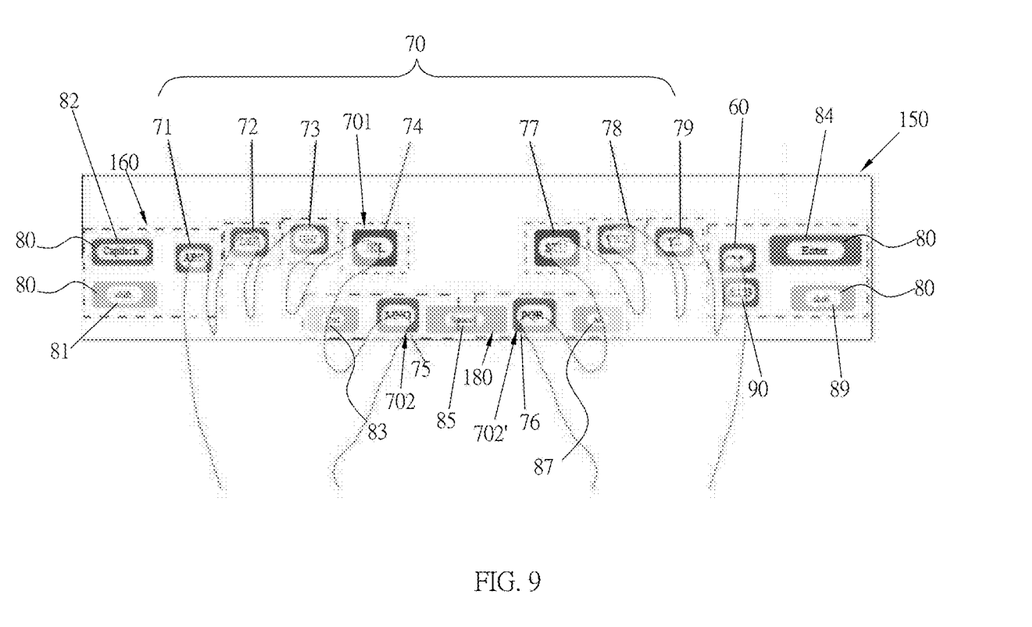
FIG. 9 is a schematic view showing the third embodiment of the virtual keyboard.
Figure 10:
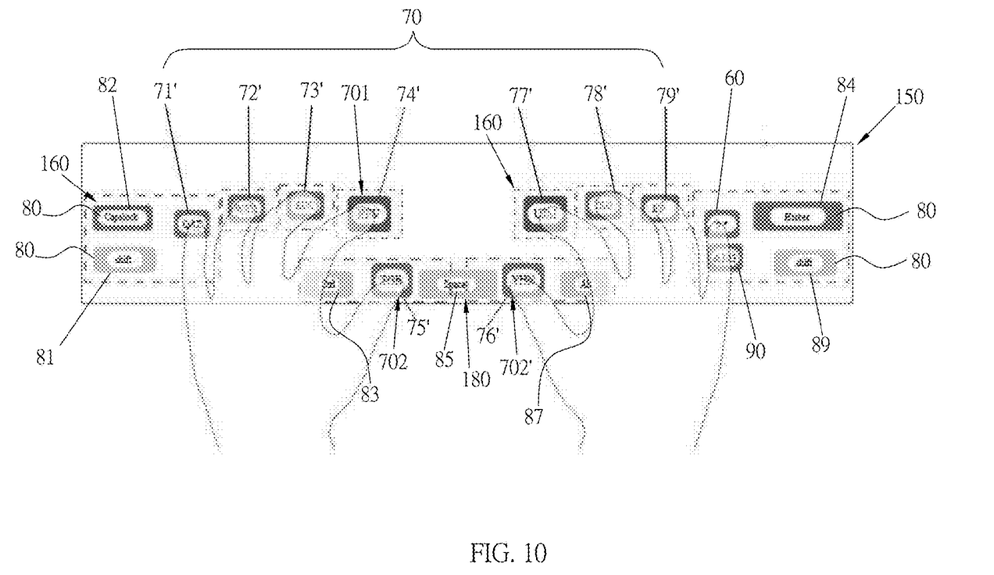
FIG. 10 is a schematic view showing the fourth embodiment of the virtual keyboard.

Referring to FIGS. 9 and 10, in the third and fourth embodiment of the virtual keyboard 150, the character keys 70 are 7 upper character keys 701, a lower left character key 702 and a lower right character key 702'. Each of the character keys 70 serves for inputting two or three different letters. The upper key set 160 includes 10 keys which are the Caps Lock key 82, the 7 upper character keys 701, the symbol key 60 and the enter key 84 respectively from a left side to a right side of the upper key set 160. The lower key set 180 includes 8 keys which are the first shift key 81, the control key 83, the lower left character key 702, the space key 85, the lower right character key 702', the Alt key 87, the number key 90 and the second shift key 89 respectively from a left side to a right side of the lower key set 180. The lower left character key 702 is a MNO key 75 corresponded to three letters "M", "N" and "O", or a TGB key 75' corresponded to three letters "T", "G" and "B". The lower right character key 702' is a PQR key 76 corresponded to three letters "P", "Q" and "R", or a YHN key 76' corresponded to three letters "Y", "H" and "N".

In the third embodiment of the virtual keyboard 150 (as shown in FIG. 9), the 7 upper character keys 701 are formed based on an order from an upper side to a lower side of a QWERTY keyboard layout. The 7 upper character keys 701 from the left side to the right side of the virtual keyboard 150 are an ABC key 71 corresponded to three letters "A", "B" and "C", a DEF key 72 corresponded to three letters "D", "E" and "F", a GHI key 73 corresponded to three letters "G", "H" and "I", a JKL key 74 corresponded to three letters "J", "K" and "L", a STU key 77 corresponded to three letters "S", "T" and "U", a VWX key 78 corresponded to three letters "V", "W" and "X", and a YZ key 79 corresponded to two letters "Y" and "Z", respectively.

In the fourth embodiment of the virtual keyboard 150 (as shown in FIG. 10), the 7 upper character keys 701 are formed based on an order from an upper side to a lower side of a QWERTY keyboard layout. The 7 upper character keys 701 from the left side to the right side of the virtual keyboard 150 are a QAZ key 71' corresponded to three letters "Q", "A" and "Z", a WSX key 72' corresponded to three letters "W", "S" and "X", a EDC key 73' corresponded to three letters "E", "D" and "C", a RFV key 74' corresponded to three letters "R", "F" and "V", a UJM key 77' corresponded to three letters "U", "J" and "M", a IK key 78' corresponded to two letters "I" and "K", a OLP key 79' corresponded to three letters "O", "L" and "P", respectively.

Figure 11:
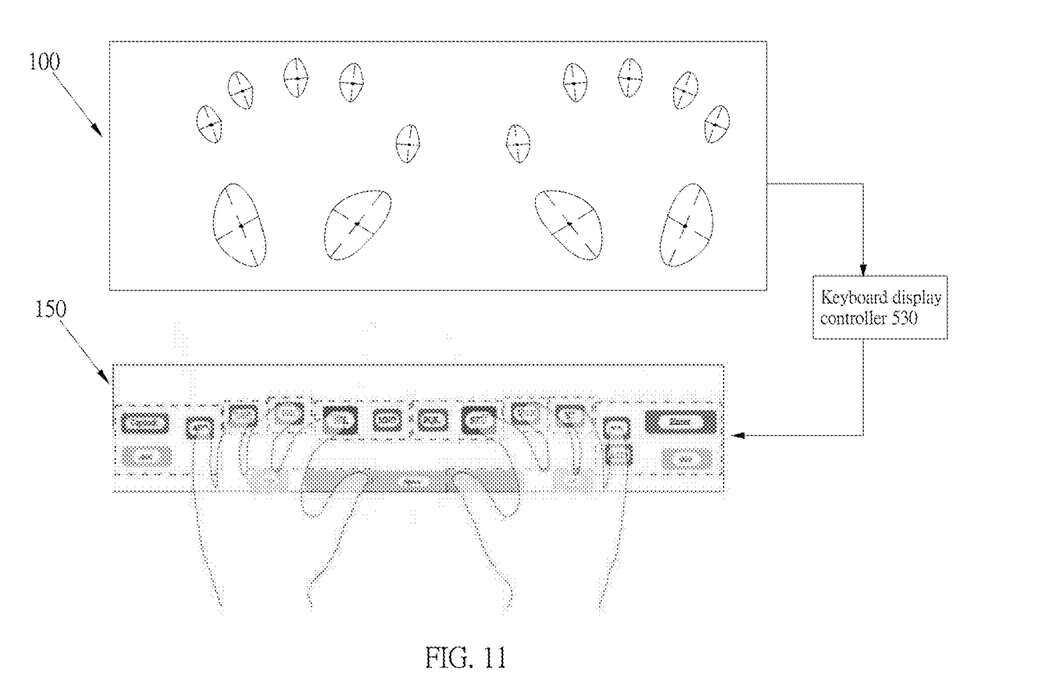
FIG. 11 is a schematic view showing the operation of the keyboard display controller.

A keyboard display controller 530 is connected to the preprocess unit 500. The keyboard display controller 530 serves to receive the touch data frame 100 from the preprocess unit 500. When the touch data frame 100 is corresponded to a keyboard displaying gesture, the keyboard display controller 530 drives the touch screen 27 to display the virtual keyboard 150 and the touch data frame 100 is successively processed by the preprocess unit 500 (step 2 in FIG. 3 or FIG. 5). Referring to FIG. 11, the keyboard displaying gesture corresponding to the touch data frame 100 is formed by a touch action with the palms of two hands and a specific number of fingers of the user. The virtual keyboard 150 is displayed on the touch screen 27 at a position corresponding to a location of the keyboard displaying gesture on the touch screen 27.

The preprocess unit 500 is capable of receiving specific key inputs inputted by the user on the virtual keyboard 150 and specific handwriting symbols inputted by the user on the touch screen 27 simultaneously when the virtual keyboard 150 is displayed on the touch screen 27. That is, the user can input the key inputs and the handwriting symbols simultaneously. The recognition of the key inputs and the handwriting symbols is explained as the following.

The input recognition unit 570 is connected to the preprocess unit 500. When the virtual keyboard 150 is displayed on the touch screen 27, the input recognition unit 570 serves to determine whether the touch data frame 100 is corresponded to the specific key inputs or a plurality of non-key inputs (such as at least one handwriting symbol) (step 3). Determination of the input recognition unit 570 may be based on an actual input habit of the user. For example, the touch data frame 100 may be corresponded to specific key inputs if the touch data frame 100 can be corresponded to the touch action of the user on the virtual keyboard 150 and the touch action only includes an action with clicks or an action with clicks more than a specific number. The specific key inputs may be corresponded to at least one character or number or symbol. When the touch data frame 100 is corresponded to the specific key inputs, the specific key inputs is viewed as a plurality of consecutive key inputs and the input recognition unit 570 transmits the key inputs to a corpus 571 for performing a grammar matching (step 4). For the accuracy of the operation, when the user needs to input a single character, a number or a symbol in the virtual keyboard 150, an auxiliary operation can be applied to achieve it. The auxiliary operation may be sliding in different directions during pressing a key of the virtual keyboard 150, or displaying a selection panel by long-pressing a key of the virtual keyboard 150, which causes that the user can perform a selection.

The touch classifier 510 is connected to the input recognition unit 570. The touch classifier 510 serves to determine whether the key inputs corresponding to the touch data frame 100 and matched by the corpus 571 is capable of being directly processed by the OS 22 (step 5). When the key inputs matched by the corpus 571 is capable of being directly processed by the OS 22, the touch classifier 510 outputs the touch data frame 100 to the OS 22 for processing and the touch IC 26 is controlled to perform the initial processing (step 1) again for processing a next touch data frame 100.

The AI classifier 540 is connected to the touch classifier 510. When the touch classifier 510 determines that the touch data frame 100 is not capable of being directly processed by the OS 22 (in the step 5), or the input recognition unit 570 determines that the touch data frame 100 is the non-key inputs (in the step 3), or the input recognition unit 570 determines that the virtual keyboard 150 is not displayed during receiving of the touch data frame 100 (in the step 3), or the input recognition unit 570 is unable to determine whether the virtual keyboard 150 is displayed (in the step 3), the touch classifier 510 outputs the touch data frame 100 to the AI classifier 540 for classifying the touch data frame 100 (step 6).

In the classifying of the touch data frame 100, the touch data frame 100 from the touch classifier 510 or the recognition unit 570 is inputted into the AI recognition module 200 located in the AI classifier 540 for recognizing the touch data frame 100 and the AI recognition module 200 outputs an AI recognizing result. The AI recognizing result is stored in the touch data frame 100 for determining whether the touch data frame 100 corresponds to the specific key inputs, the specific operation gesture or the at least one specific handwriting symbol (step 7). The at least one handwriting symbol is corresponded at least one character or a mathematical expression.

The AI recognition module 200 is a recognition module trained and tested with training and testing data. In training and testing of the AI recognition module 200, a plurality of training and testing touch data items captured from a single user and various users are used as inputs of the AI recognition module 200, and a plurality of key inputs, operation gestures or handwriting symbols corresponded to the training and testing touch data items are used as expected outputs of the AI recognition module 200. The AI recognition module 200 is trained and tested by the inputs and outputs for obtaining a function of recognizing the touch data items 110, that is, the AI recognition module 200 is capable of recognizing the key inputs, operation gestures or handwriting symbols corresponded to the touch data items 110. The AI recognition module 200 may be a neural network module.

In a training stage of handwriting symbol recognizing of the AI recognition module 200, an input of the AI recognition module 200 is a character or a mathematical expression written on the touch screen 27 by fingers of the user or a stylus. An output of the AI recognition module 200 is corresponded to a predetermined program code.

In the step 7, in the AI classifier 540, when the AI recognizing result is corresponded to the specific operation gesture, the AI classifier 540 outputs the touch data frame 100 to the OS 22 for processing and the touch IC 26 is controlled to perform the initial processing (step 1) again for processing a next touch data frame 100.

The symbol corrector 550 is connected to the AI classifier 540 and includes a pre-trained symbol model 16. In the step 7, in the AI classifier 540, when the AI recognizing result is corresponded to the at least one specific handwriting symbol, the AI classifier 540 outputs the touch data frame 100 to the symbol corrector 550 for performing a symbol correction (step 9). The AI recognizing result is viewed as a sequence of handwriting symbols. The symbol correction is performed by using the symbol model 16 which predicts and corrects the handwriting symbols of the AI recognizing result for improving an input accuracy and an input speed. The handwriting symbols are corresponded to at least one character or a mathematical expression.

The symbol model 16 is an AI symbol model which includes a plurality of pre-established symbol rules. The symbol rules represent a plurality of correct legal inputs of the virtual keyboard 150, and a plurality of correction rules. The correction rules are used to correct errors caused by written errors, grammar errors of a character string, rule errors of a mathematical expression corresponded to the handwriting symbols inputted by the user, and to correct errors caused by recognizing of the AI recognition module 200. The AI recognizing result is corrected by the symbol rules.

The symbol corrector 550 serves to output the AI recognizing result corrected to the OS 22 for processing and the touch IC 26 is controlled to perform the initial processing (step 1) again for processing a next touch data frame 100.

When the handwriting symbols corrected by the symbol corrector 550 are corresponded to a character or a character string, the symbol corrector 550 edits the character or character string by using a character editor 551. The character or character string can be edited in the character editor 551 by using a Unicode or ASCII format.

When the handwriting symbols corrected by the symbol corrector 550 are corresponded to a mathematical expression (which is represented by a specific program code), the symbol corrector 550 compiles the program code corresponding to the mathematical expression by using a specific mathematical program language. The mathematical program language may be LaTeX or MathML (Mathematical Markup Language), while any mathematical program language may be used in the present invention. The program code corresponding to the mathematical expression is compiled by the mathematical program language to be converted to a formatted mathematical expression to be displayed.

For example, for the mathematical program language, LaTeX, a program code of "\\frac {1} {3}" will be converted into a formatted mathematical expression: $\frac{1}{3}$ by compiling of LaTeX.

When the handwriting symbols corresponding to the AI recognizing result are not supported by any application, a program code corresponding to the handwriting symbols is outputted without any further processing.

The grammar corrector 560 is connected to the AI classifier 540 and includes a pre-trained language grammar model 14. In the step 7, in the AI classifier 540, when the AI recognizing result is corresponded to the specific key inputs, the AI classifier 540 outputs the touch data frame 100 to the grammar corrector 560 for performing a grammar correction (step 8). The AI recognizing result is viewed as a sequence of input results of the virtual keyboard 150. The grammar correction is performed by using the language grammar model 14 which predicts and corrects a grammar of the AI recognizing result for improving an input accuracy and an input speed.

The language grammar model 14 is an AI grammar model which includes a plurality of pre-established grammar rules. The grammar rules represent a plurality of correct legal inputs of the virtual keyboard 150, and a plurality of correction rules. The correction rules are used to correct errors caused by wrong keys touched by the user, and to correct errors caused by recognizing of the AI recognition module 200. The AI recognizing result is corrected by the grammar rules.

The AI recognizing result corrected by the grammar corrector 560 forms a HID (human inter device) information (which represents the input results of the virtual keyboard 150). The grammar corrector 560 serves to output the AI recognizing result corrected to the OS 22 for processing and the touch IC 26 is controlled to perform the initial processing (step 1) again for processing a next touch data frame 100.

The virtual keyboard 150 further includes a classification key 152 which serves to control the touch screen 27 to display a symbol input area 153 for receiving at least one input symbol written by fingers of the user or a stylus. The at least one input symbol (such as at least one character or a mathematical expression) inputted to the symbol input area 153 is corresponded to the at least one specific handwriting symbol in the processing of the touch data frame 100 and is recognized by the AI classifier 540. The classification key 152 further serves to control the touch screen 27 to display a row of keys arranged with a specific keyboard layout (such as a QWERTY keyboard layout) or to receive an operation gesture inputted by the user without displaying the virtual keyboard 150 and the symbol input area 153.

Figure 4:
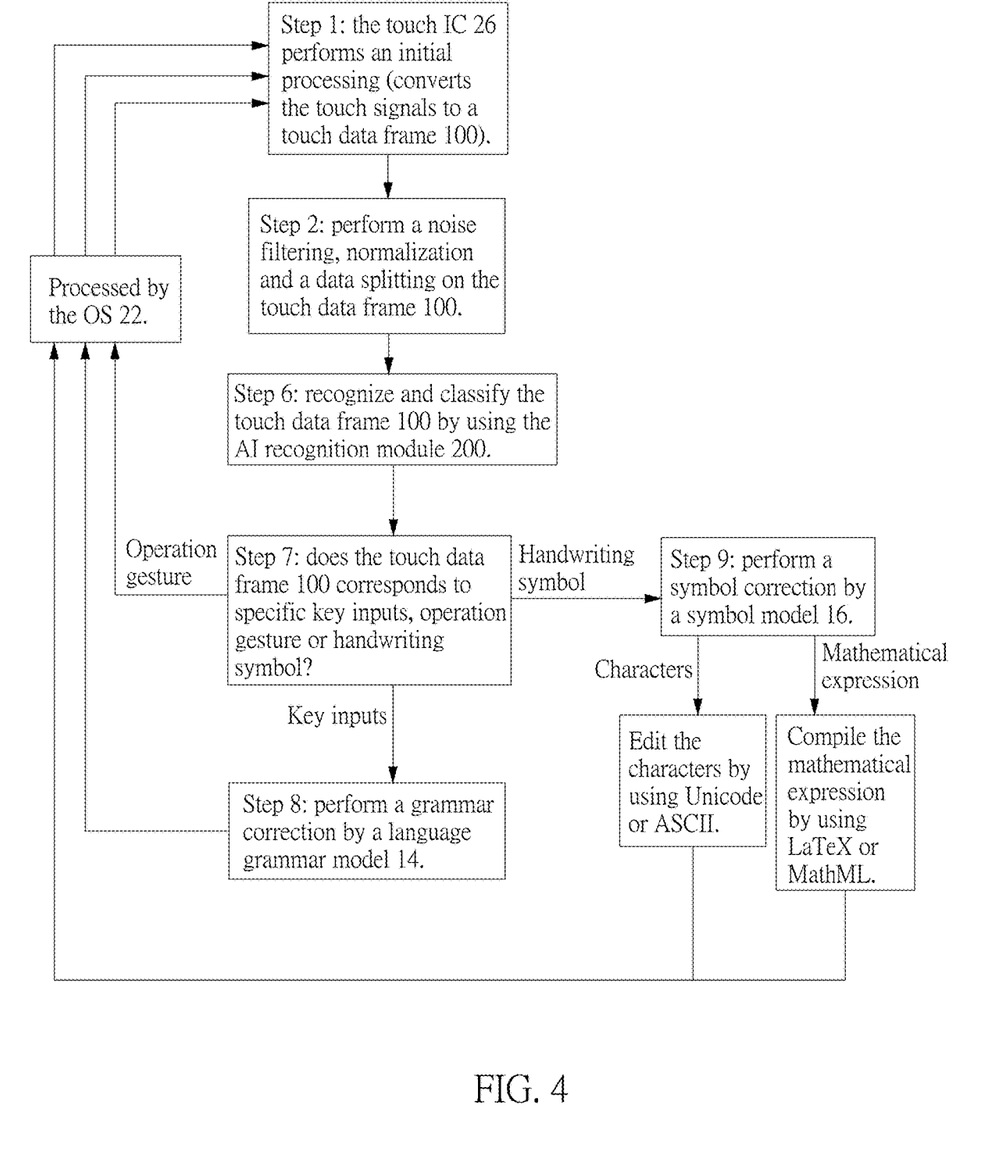
FIG. 4 is another steps flow diagram showing steps of operations of the touch data processing, wherein the classifying of the touch data frame is performed by the AI classifier only.
Figure 5:
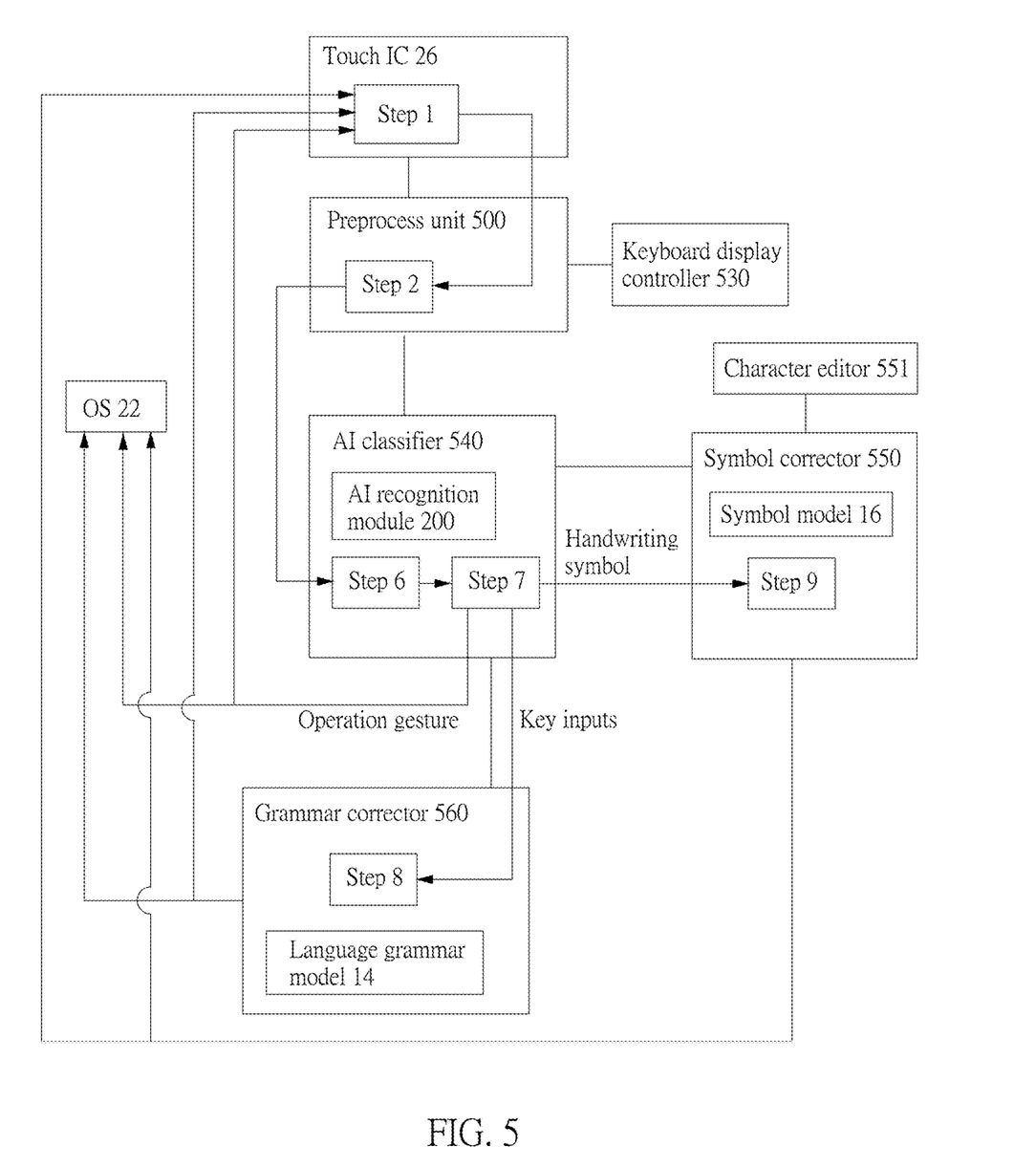
FIG. 5 is another structured block diagram showing the elements related to the touch data processing, wherein the classifying of the touch data frame is performed by the AI classifier only.

Referring to FIGS. 4 and 5, the touch classifier 510 and the input recognition unit 570 may not be used in the present invention. The touch data frame 100 from the preprocess unit 500 is directly inputted to the AI classifier 540 for processing (That is the step 2 followed by the step 6). The classifying of the touch data frame 100 is entirely performed by the AI classifier 540.

The present invention performs a processing of AI recognizing on the touch data frame 100 to achieve correct touch operations. By using the processing of AI recognizing, the touch data items 110 of the touch data frame 100 from a touch device can be recognized as touching of the user's fingers or palms, or other touch actions not required for operating (such as that the user's hands are just placed on the touch device and do not perform any input action). The present invention is capable of fitting various operating conditions of the user by using AI learning in the training and testing of the AI recognition module 200.

The advantages of the present invention are that the present invention is capable of pre-determining whether the input data of a stylus, gesture or virtual keys on the touch screen is capable of directly processed by the operating system of the touch device having the touch screen. When the input data is capable of directly processed by the operating system, the operating system is used for recognizing the gesture or virtual keys. When the input data is not capable of directly processed by the operating system, the input data from the gesture or stylus are predicted and recognized by using an AI recognition module so that the recognizing result can be processed by the operating system. Therefore, the user can operate the touch screen as smooth and fast as using actual keys. The AI recognition module of the present invention is used for recognizing multiple key inputs, operation gestures and handwriting symbols (including characters and mathematical expressions) simultaneously. The key inputs and handwriting symbols are corrected by a grammar correction and a symbol correction respectively. Therefore, the accuracy of the gestures, key inputs and stylus input on the touch screen and the response speed of the touch input are improved, which increases the user's input speed on the touch screen and reduces the errors of input or operation on the touch screen so that the user's operating experience is improved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fast multiple input keyboard system on a touch screen comprising:

the touch screen serving to receive a touch action of a user for generating a plurality of touch signals; the touch screen being a touch panel of an electronic device;

a virtual keyboard displayed on the touch screen;

a touch IC connected to the touch screen; the touch IC serving to receive the touch signals from the touch screen and to convert the touch signals to a touch data frame which has a 2D (two-dimensional) structure formed by a plurality of touch data items;

a processor set connected to the touch IC and an OS (Operating System); the processor set serving to receive the touch data frame from the touch IC and to perform a touch data processing on the touch data frame; the touch data processing being performed by using a processing directly executed by the OS; and wherein in the touch data processing, when the touch data frame corresponds to a plurality of first inputs and a number of the first inputs is less than a predetermined number, the touch data frame is viewed as a data frame which is capable of being directly processed by the OS and is outputted to the OS for processing;

when the touch data frame corresponds to a plurality of second inputs and a number of the second inputs is larger than or equal to the predetermined number, the touch data frame is viewed as a data frame which is not capable of being directly processed by the OS and is outputted to an AI (artificial intelligence) recognition module for recognizing the touch data frame; the AI recognition module is connected to the processor set; an AI recognizing result outputted by the AI recognition module is outputted to the processor set;

when the AI recognizing result is corresponded to a plurality of specific key inputs, the processor set performs a grammar correction on the specific key inputs and a result of the grammar correction on the specific key inputs is outputted to the OS for processing;

when the AI recognizing result is corresponded to at least one specific handwriting symbol including a character string or a mathematical expression, the processor set performs a symbol correction on the at least one specific handwriting symbol and a result of the symbol correction on the at least one specific handwriting symbol is outputted to the OS for processing; when the AI recognizing result is corresponded to a specific operation gesture, the processor set outputs the specific operation gesture to the OS for processing;

when the processing of the OS is completed, the OS outputs related data to a respective application connected to the OS;

the virtual keyboard including an upper key set and a lower key set positioned on a lower side of the upper key set; and the virtual keyboard further including a plurality of function keys, number key and a symbol key which are arranged on a left side and a right side of the virtual keyboard, and a plurality of character keys which are arranged on a center of the virtual keyboard.

2. The fast multiple input keyboard system on the touch screen as claimed in claim 1, wherein the function keys include a Caps Lock key, a enter key, a first shift key, a control key, a space key, a Alt key and a second shift key; the upper key set is in a symmetrical M shape for accommodating two hands of the user; the lower key set is in a concave curved shape; and the lower key set includes the control key, the space key and the Alt key.

3. The fast multiple input keyboard system on the touch screen as claimed in claim 2, wherein the character keys are 9 character keys; the upper key set includes 12 keys which are the Caps Lock key, the 9 character keys, the symbol key and the enter key respectively from a left side to a right side of the upper key set; each of the 9 character keys serves for inputting two or three different letters; the lower key set includes 6 keys which are the first shift key, the control key, the space key, the Alt key, the number key and the second shift key respectively from a left side to a right side of the lower key set.

4. The fast multiple input keyboard system on the touch screen as claimed in claim 3, wherein the 9 character keys from the left side to the right side of the virtual keyboard are an ABC key corresponded to three letters "A", "B" and "C", a DEF key corresponded to three letters "D", "E" and "F", a GHI key corresponded to three letters "G", "H" and "I", a JKL key corresponded to three letters "J", "K" and "L", a MNO key corresponded to three letters "M", "N" and "O", a PQR key corresponded to three letters "P", "Q" and "R", a STU key corresponded to three letters "S", "T" and "U", a VWX key corresponded to three letters "V", "W" and "X", and a YZ key corresponded to two letters "Y" and "Z", respectively; or the 9 character keys from the left side to the right side of the virtual keyboard are a QAZ key corresponded to three letters "Q", "A" and "Z", a WSX key corresponded to three letters "W", "S" and "X", a EDC key corresponded to three letters "E", "D" and "C", a RFV key corresponded to three letters "R", "F" and "V", a TGB key corresponded to three letters "T", "G" and "B", a YHN key corresponded to three letters "Y", "H" and "N", a UJM key corresponded to three letters "U", "J" and "M", a IK key corresponded to two letters "I" and "K", a OLP key corresponded to three letters "O", "L" and "P", respectively.

5. The fast multiple input keyboard system on the touch screen as claimed in claim 2, wherein the character keys are 7 upper character keys, a lower left character key and a lower right character key; each of the character keys serves for inputting two or three different letters; the upper key set includes 10 keys which are the Caps Lock key, the 7 upper character keys, the symbol key and the enter key respectively from a left side to a right side of the upper key set; the lower key set includes 8 keys which are the first shift key, the control key, the lower left character key, the space key, the lower right character key, the Alt key, the number key and the second shift key respectively from a left side to a right side of the lower key set; the lower left character key is a MNO key corresponded to three letters "M", "N" and "O", or a TGB key corresponded to three letters "T", "G" and "B"; and the lower right character key is a PQR key corresponded to three letters "P", "Q" and "R", or a YHN key corresponded to three letters "Y", "H" and "N".

6. The fast multiple input keyboard system on the touch screen as claimed in claim 5, wherein the 7 upper character keys from the left side to the right side of the virtual keyboard are an ABC key corresponded to three letters "A", "B" and "C", a DEF key corresponded to three letters "D", "E" and "F", a GHI key corresponded to three letters "G", "H" and "I", a JKL key corresponded to three letters "J", "K" and "L", a STU key corresponded to three letters "S", "T" and "U", a VWX key corresponded to three letters "V", "W" and "X", and a YZ key corresponded to two letters "Y" and "Z", respectively; or     the 7 upper character keys from the left side to the right side of the virtual keyboard are a QAZ key corresponded to three letters "Q", "A" and "Z", a WSX key corresponded to three letters "W", "S" and "X", a EDC key corresponded to three letters "E", "D" and "C", a RFV key corresponded to three letters "R", "F" and "V", a UJM key corresponded to three letters "U", "J" and "M", a IK key corresponded to two letters "I" and "K", a OLP key corresponded to three letters "O", "L" and "P", respectively.

* * * * *